(12) United States Patent
Patil

(10) Patent No.: US 8,311,707 B2
(45) Date of Patent: Nov. 13, 2012

(54) METHODS AND SYSTEMS FOR IMPROVED DETECTION OF MINISPARE TIRES

(75) Inventor: Nachiket D. Patil, Farmington, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/432,260

(22) Filed: Mar. 28, 2012

(65) Prior Publication Data
US 2012/0191299 A1 Jul. 26, 2012

Related U.S. Application Data

(63) Continuation of application No. 12/211,258, filed on Sep. 16, 2008, now Pat. No. 8,170,755.

(51) Int. Cl.
*G05D 1/00* (2006.01)

(52) U.S. Cl. ............ 701/48; 701/37; 701/70; 303/146; 303/151; 303/113.1; 303/113.5

(58) Field of Classification Search .............. 701/37, 701/48, 70; 303/146, 151, 113.1, 113.5
See application file for complete search history.

(56) References Cited

U.S. PATENT DOCUMENTS

| | | | |
|---|---|---|---|
| 4,545,623 A | 10/1985 | Sato et al. |
| 4,678,243 A | 7/1987 | Leiber |
| 5,150,098 A | 9/1992 | Rakow |
| 5,299,131 A | 3/1994 | Haas et al. |
| 5,534,672 A | 7/1996 | Meagher |
| 5,734,265 A | 3/1998 | Toyoda et al. |
| 5,852,788 A | 12/1998 | Toyoda et al. |
| 5,921,281 A | 7/1999 | Takayama |
| 6,047,231 A | 4/2000 | Rodrigues et al. |
| 6,163,256 A | 12/2000 | Brown |
| 6,259,361 B1 | 7/2001 | Robillard et al. |
| 6,304,802 B1 | 10/2001 | Stuible et al. |
| 6,450,589 B2 | 9/2002 | Dieringer et al. |
| 6,554,376 B2 | 4/2003 | Schmitt et al. |
| 6,616,569 B2 | 9/2003 | Hoang et al. |
| 6,985,076 B1 | 1/2006 | Bennie et al. |
| 7,030,745 B2 | 4/2006 | Utter et al. |
| 7,066,559 B2 | 6/2006 | Imamura |
| 7,301,446 B2 | 11/2007 | Ray et al. |
| 7,307,518 B2 | 12/2007 | Bogos |
| 7,391,309 B2 | 6/2008 | Chartier et al. |
| 2002/0161504 A1 | 10/2002 | Schmitt et al. |
| 2005/0200464 A1 | 9/2005 | Bennie et al. |
| 2006/0175898 A1 | 8/2006 | Loche et al. |
| 2006/0267750 A1 | 11/2006 | Lu et al. |
| 2007/0112477 A1 | 5/2007 | Van Zanten et al. |

FOREIGN PATENT DOCUMENTS

| | | |
|---|---|---|
| DE | 102004005184 | 1/2005 |
| JP | 4173436 | 6/1992 |
| JP | 11180280 | 7/1999 |
| JP | 2001039291 | 2/2001 |
| JP | 2004131010 | 4/2004 |

*Primary Examiner* — John Nguyen
*Assistant Examiner* — Jordan Fei
(74) *Attorney, Agent, or Firm* — Michael Best & Friedrich LLP

(57) ABSTRACT

A method of detecting a minispare tire in a vehicle having a vehicle control system. The method includes detecting a rotational velocity of each of a plurality of wheels of the vehicle; determining whether a minispare tire is mounted on the vehicle based on the rotational velocities detected at each of the plurality of wheels; adjusting the vehicle control system if a minispare tire is mounted on the vehicle; sensing a hydraulic pressure of a braking system of the vehicle; and suspending determination of whether a minispare tire is mounted on the vehicle if the hydraulic pressure exceeds a predetermined critical pressure level.

14 Claims, 2 Drawing Sheets

METHODS AND SYSTEMS FOR IMPROVED DETECTION OF MINISPARE TIRES

RELATED APPLICATIONS

This application is a continuation of U.S. patent application Ser. No. 12/211,258 filed Sep. 16, 2008, the entire content of which is hereby incorporated by reference.

BACKGROUND

The present invention relates to vehicle control systems, and in particular to methods and systems for detecting the presence of a minispare tire and suspending detection during braking.

Minispare tires are an alternative to full-sized spare tires in vehicles. The minispare tire is typically smaller, weighs less, and has a higher inflation pressure than a regular tire and, when installed in place of a damaged conventional tire, is sufficiently durable to allow the vehicle to travel to a nearby service station for assistance.

While minispares have a number of positive attributes, their smaller dimensions and higher inflation pressure compared to standard tires, can alter the performance of a vehicle's electronic stability control (ESC) system, traction control system (TCS), or antilock braking system (ABS). Therefore, vehicles include sensors or other devices to detect the presence of a minispare tire, so that appropriate corrections to the vehicle controls can be made to account for the presence of the minispare tire. Detection of a minispare tire is performed on a continuous basis, for example, by measuring the relative speeds of the wheels on the vehicle. Due to the smaller circumference, a minispare tire will have a greater rotational velocity than standard-sized tires at a given vehicle speed. Thus, if one wheel has a significantly higher rotational velocity than the others, it is assumed that a minispare tire is present and appropriate corrections are made in the vehicle control systems (e.g., ESC, TCS, and ABS).

However, detection of minispare tires is temporarily suspended when the vehicle's brakes are applied, in part because one or more tires including the minispare could slip during braking, which could lead to increased detection times or possibly inaccurate wheel-speed measurements. This is a particular problem on surfaces with a low coefficient of friction (low-p surfaces) such as ice or wet pavement.

One method that has been used to detect whether the vehicle's brakes are being applied is to determine whether the brake light switch (BLS) has been activated. The BLS is directly coupled to the brake pedal itself and responds to minimal movement of the pedal, even before any hydraulic pressure is built up in the braking system. When the BLS is activated the vehicle's control systems suspend minispare detection.

SUMMARY OF THE INVENTION

A problem may arise with suspending minispare detection based on BLS activation when the vehicle is driven by a so-called 'two-footed' driver. Drivers who control the accelerator and brake pedals using both feet, with one foot continuously resting on the brake pedal, apply a small amount of pressure to the brake pedal, which activates the BLS and, as a consequence, suspends minispare detection. For a two-footed driver who routinely leaves a foot resting on the brake pedal, this means that minispare detection is suspended for a significant amount of time that the vehicle is in operation.

In one aspect, the invention provides a method of detecting a minispare tire in a vehicle having a vehicle control system. The method includes detecting a rotational velocity of each of a plurality of wheels of the vehicle; determining whether a minispare tire is mounted on the vehicle based on the rotational velocities detected at each of the plurality of wheels; adjusting the vehicle control system if a minispare tire is mounted on the vehicle; sensing a hydraulic pressure of a braking system of the vehicle; and suspending determination of whether a minispare tire is mounted on the vehicle if the hydraulic pressure exceeds a predetermined critical pressure level.

In another aspect, the invention provides a system for suspending detection of a minispare tire in a vehicle. The system includes a plurality of wheel speed sensors, where each speed sensor is attached to a wheel of the vehicle such that the speed sensor measures a rotational velocity of the wheel. The system also includes a braking system including a master cylinder; a brake pedal attached to the master cylinder; and a hydraulic pressure sensor to measure hydraulic pressure within the braking system. The system further includes a vehicle control system having a control unit in operative communication with the braking system and wheel speed sensors. The control unit has a logic unit and a storage unit. The storage unit has a "critical pressure level" value stored therein. The logic unit is configured to receive the rotational velocity values from the wheel speed sensors; analyze the relative rotational velocities of the wheels to determine whether a minispare tire is mounted on a wheel; receive the hydraulic pressure value from the hydraulic pressure sensor; compare the hydraulic pressure value to the critical pressure level stored in the storage unit; and, if the hydraulic pressure level is less than or equal to the critical pressure level, adjust the vehicle control system for the presence of a minispare tire.

In still another aspect, the invention provides a method of operating a vehicle control system. The method includes detecting a rotational velocity of each of a plurality of wheels of a vehicle; sensing hydraulic pressure in a braking system of the vehicle; determining whether a minispare tire is mounted on the vehicle based on the rotational velocities of the wheel, if the hydraulic pressure in the braking system is at or below a predetermined critical pressure; and adjusting the vehicle control system if it has been determined that a minispare tire is mounted on the vehicle.

In yet another aspect, the invention is a method of detecting a two-footed driver in a vehicle. The method includes driving a vehicle at a constant speed; increasing pressure applied to a braking system of the vehicle; measuring hydraulic pressure in the braking system; and recording a critical hydraulic pressure in the braking system when the vehicle speed decreases.

BRIEF DESCRIPTION OF THE DRAWINGS

Other objects and advantages of the invention will become apparent upon reading the following detailed description and upon reference to the accompanying drawings in which.

DETAILED DESCRIPTION OF THE INVENTION

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways.

An improved system and method of detecting minispare tires involves detecting the braking pressure applied by the driver and suspending minispare tire detection only when braking pressure exceeds a predetermined critical level, i.e., a level at which braking pressure that is applied at the wheels could lead to inaccurate wheel speed measurements.

Typically, a two-footed driver will adjust the level of pressure that he or she applies to the brake pedal so as not to produce noticeable slowing of the vehicle. At or below this minimal level of applied brake pressure, minispare detection can be conducted without a concern that the wheels will slip due to braking or that detection times will be increased, as might happen during heavier braking.

Figure 1:
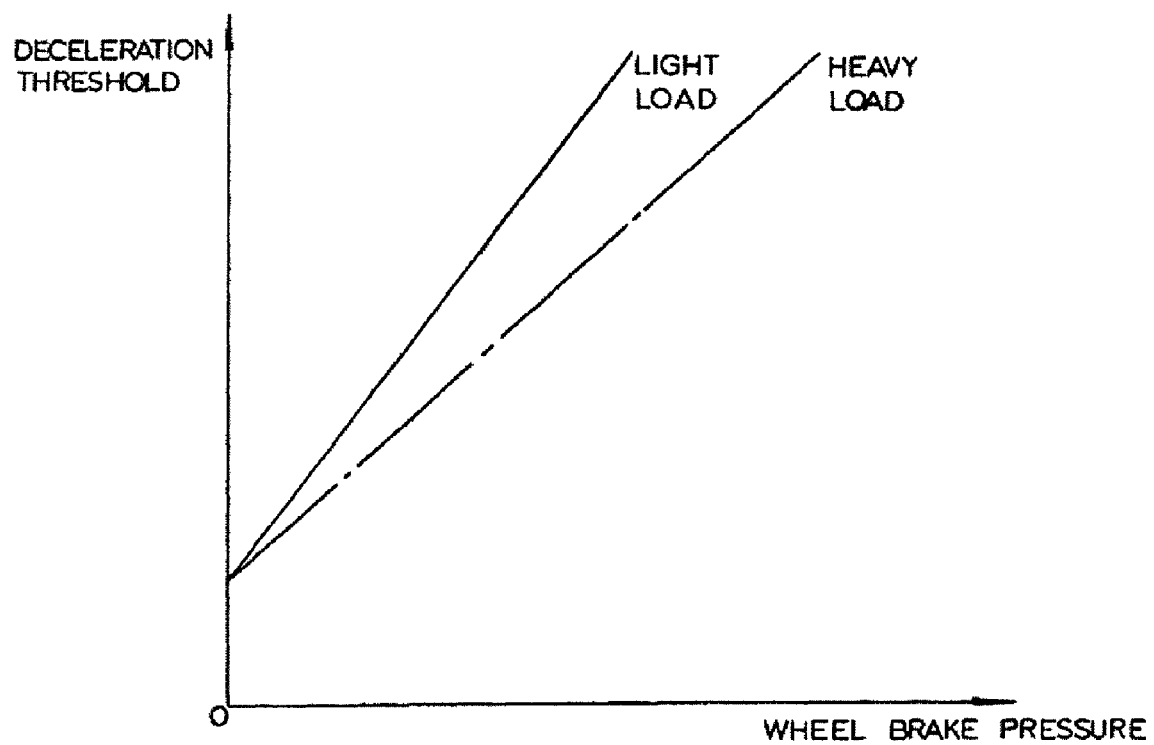
FIG. 1 is a graph showing the relation between 'deceleration threshold' and 'wheel brake pressure' for a light load or a heavy load.

FIG. 1 shows the relation between 'deceleration threshold' and 'wheel brake pressure' for different types of load. The wheel brake pressure is the hydraulic pressure generated at the wheel. The deceleration threshold is the value of the hydraulic pressure generated at the wheel which would lead to deceleration of the vehicle. In one construction, the deceleration threshold is the hydraulic pressure which leads to at least a 5 kilometers per hour (kph) decrease in vehicle speed. In general, the deceleration threshold is a function of gross vehicle weight (GVW) and the coefficient of friction between the tires and the surface on which the vehicle is traveling. Thus, in one construction the invention involves identifying a critical pressure level of the hydraulic braking system at which noticeable deceleration of the vehicle occurs. This critical pressure level is also related to how tightly the brake mechanisms (the calipers or shoes) grip the wheels (via the discs or drums), which in turn can depend on the age and condition of the components of the braking system.

To implement the present methods in a vehicle control system, a critical hydraulic braking pressure level is determined for a particular vehicle or class of vehicles, as discussed further below. In practice, setting a critical hydraulic braking pressure level in a vehicle control system may take into account either the typical or the upper limit of GVW for the vehicle, as well as either the typical or the lower limit of coefficient of friction for the surfaces that the vehicle is expected to encounter.

After determining the critical hydraulic braking pressure level, this information is programmed into the controller for the vehicle control system(s). The controller for the particular vehicle control system generally includes a logic unit and data storage unit and receives inputs from various sensors which can include wheel speed sensors and a brake hydraulic pressure sensor. The controller is programmed to determine rotational velocities of each of the wheels, and to determine the presence of a minispare tire, unless brake pressure above the critical level is applied. The critical hydraulic braking pressure level is entered into the data storage unit. The data storage unit may contain a single pressure level which corresponds to the critical hydraulic braking pressure level for the particular vehicle that the controller is associated with. Alternatively, a table of critical hydraulic braking pressure levels may be entered into the data storage unit, the values corresponding to critical pressure levels for several different vehicles in which the controller may be installed. Upon installation into a particular vehicle, the controller is programmed to use the critical pressure value associated with that vehicle.

The described methods can be used on various types of vehicle control systems which monitor wheel speed and which are affected by the presence of a minispare tire, including an antilock braking system (ABS) and a traction control system, which may be parts of a comprehensive electronic stability control (ESC) system.

In various constructions, the brake pressure (e.g., measured in the master cylinder, or alternatively in other parts of the braking system) at which minispare detection is suspended can be determined in a road test. In one test, a vehicle was driven by a two-footed driver at a constant speed of 50 kph. While applying a constant throttle to maintain speed, the driver gradually depressed the brake pedal until the vehicle began decelerating noticeably, which corresponded to a 5-10 kph decrease in vehicle speed. Hydraulic brake pressure levels in the master cylinder were measured and the level of pressure at which no noticeable slowing of the vehicle was used as the threshold for minispare detection. In one test in which the vehicle was a sport-utility vehicle (SUV), it was determined that noticeable slowing of the vehicle did not occur until the brake master cylinder pressures exceeded 10 bar. Therefore minispare detection could be conducted up to that pressure level, and at hydraulic pressures above this level minispare detection would be suspended. The above pressure values pertain to braking on high friction surfaces (e.g., dry asphalt, dry concrete, and the like). However, in various constructions the pressure values will differ based on the road conditions, e.g. whether the road surfaces are wet or icy, as well as the type and condition of the brakes and the total weight of the vehicle.

Other braking tests were performed in a controlled setting with braking pressure applied automatically. Table 1 shows exemplary brake hydraulic pressures, determined in a controlled setting, above which minispare detection is suspended.

TABLE 1

Brake hydraulic pressure leading to reduction in vehicle speed up to 10 kph

| Type of vehicle (vehicle weight range) | Brake Hydraulic Pressure Range |
| --- | --- |
| Sedan (up to 5,000 lbs.) | up to 25 bar |
| Crossover (up to 7,000 lbs.) | up to 30 bar |
| SUV (up to 8,000 lbs) | up to 40 bar* |
| Light Duty Trucks (up to 8,000 lbs.) | up to 70 bar* |

*Although the weight ranges of SUVs and light duty trucks are similar, the given hydraulic pressure range of light duty trucks takes into account the higher loading capacity and thus higher GVW of light duty trucks compared to SUVs.

In one embodiment, the hydraulic brake pressure at which minispare detection is suspended varies from 1-70 bar (e.g., for high-p surfaces) to 1-100 bar (e.g., for low-p surfaces). In other embodiments, minispare detection may be suspended at hydraulic brake pressures above 5 bar, 10 bar, 15 bar, 20 bar, 30 bar, 40 bar, 50 bar, 75 bar, or 100 bar.

In various embodiments, the hydraulic pressure within the brake system is measured at various points in the hydraulic braking system, such as the master cylinder, at one or more wheels (e.g., using a pressure sensor in the brake caliper), or along the brake lines.

Figure 2:
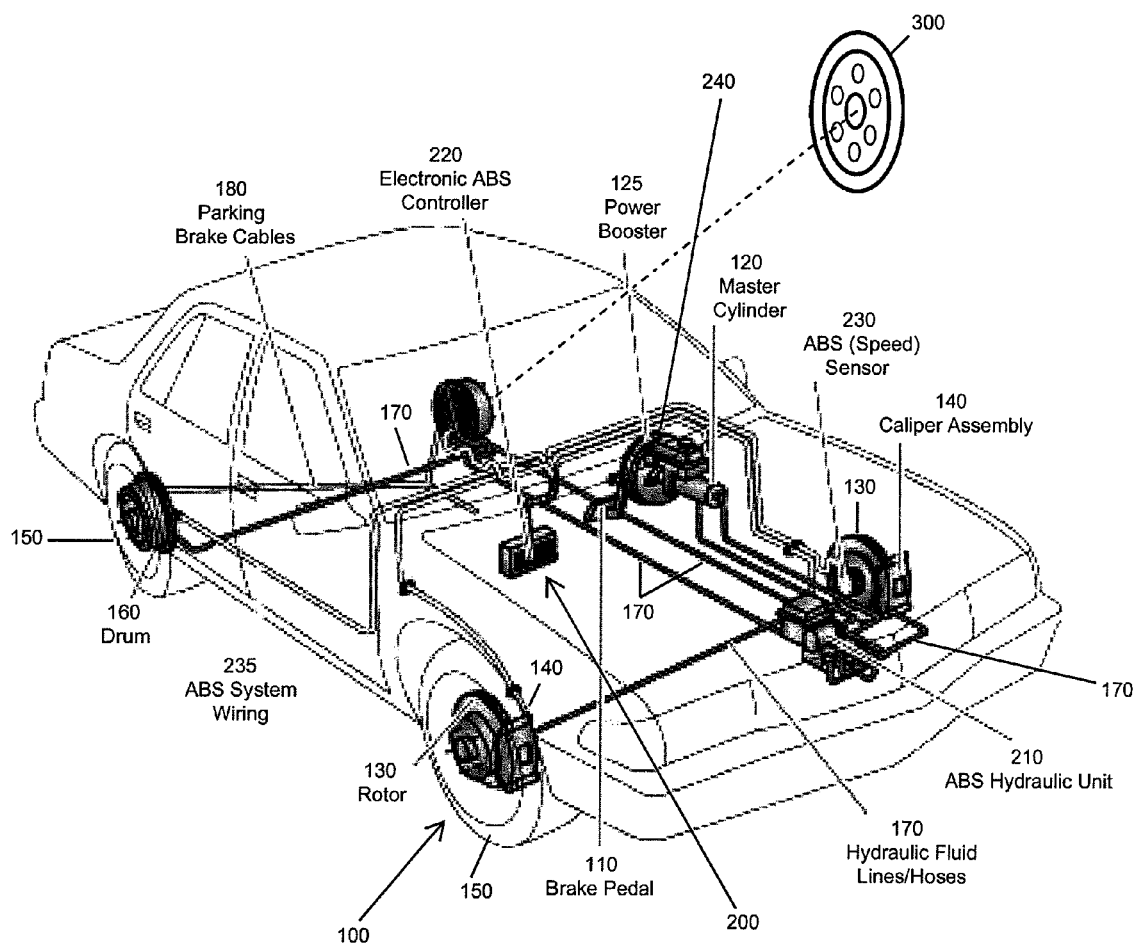
FIG. 2 is a diagram of the elements of a braking system for a vehicle having an antilock braking system (ABS).

FIG. 2 shows an example system for implementing methods of determining the presence of a minispare. FIG. 2 illustrates a vehicle, highlighting the vehicle's braking system 100 which includes an ABS control system 200. The braking system 100 includes a brake pedal 110 coupled to a master cylinder 120 via a power booster 125, rotors 130 and calipers 140 on the front wheels 150, drum brakes 160 on the rear wheels 150, hydraulic brake lines 170 connecting the drum brakes 160 and calipers 140 to the master cylinder 120 via an ABS hydraulic unit 210, and a cable-operated parking brake mechanism 180 attached to the drum brakes 160 on the rear wheels 150. The ABS system 200 includes an ABS controller 220, the ABS hydraulic unit 210, ABS speed sensors 230 on each wheel 150 to determine the rotational velocity, the speed sensors 230 coupled to the controller 220 via ABS system wiring 235, and at least one hydraulic pressure sensor 240. The braking system 100 and the ABS hydraulic unit 210 are operatively connected together using hydraulic fluid which flows through the hydraulic fluid lines 170 running between the respective components. The hydraulic pressure sensor 240 may be incorporated in the master cylinder 120 as depicted in FIG. 2. Alternatively, hydraulic pressure sensors 240 may instead or in addition be incorporated into the brake lines 170, the brake calipers 140, or the drum brake 160 assembly.

In operation the ABS system 200 measures the rotational velocity of each wheel 150 to check for the presence of a minispare tire 300 (FIG. 2). If the vehicle's driver depresses the brake pedal 110, this moves the brake pedal 110 and activates the BLS. There is generally an initial braking 'dead band' in which the brake pedal 110 moves a short distance before hydraulic pressure in the braking system 100 begins to increase. As the brake pedal 100 is pressed further, hydraulic pressure builds in the braking system 100, which can be measured by the hydraulic pressure sensor 240 in the master cylinder 120 or elsewhere in the hydraulic braking system 100, e.g. in the calipers 140, drum brakes 160, or brake lines 170. When the hydraulic pressure reaches a certain minimum level, the braking mechanisms (the calipers or shoes) will begin to activate and eventually engage the moving parts (the discs or drums). When the hydraulic pressure reaches a predetermined critical level, the electronic ABS controller 220 suspends minispare detection until the hydraulic pressure decreases below the critical level. In various constructions, suspending minispare detection may involve the controller not collecting wheel speed sensor information or may involve not altering the adjustments in the system for the presence of a minispare tire until the brake hydraulic pressure level decreases below the critical level.

The present methods can be implemented in a like manner with other control systems, such as a TCS or ESC system.

Even for those drivers who use a single foot to control the accelerator and brake pedals, embodiments of the invention allow for continued detection for the presence of a minispare tire during light braking. An additional feature of one or more embodiments is that the occurrence of falsely setting the wheel speed sensor plausibility fault in the presence of an installed minispare is reduced.

Various features and embodiments of the invention are set forth in the following claims.

What is claimed is:

1. A method for detecting a minispare tire in a vehicle, comprising:
    performing detection for a minispare tire comprising detecting a rotational velocity of each of a plurality of wheels of the vehicle and determining whether a minispare tire is mounted on the vehicle based on the rotational velocities detected at each of the plurality of wheels;
    monitoring a vehicle speed while the vehicle is in motion;
    monitoring a position of a throttle of the vehicle;
    measuring a hydraulic pressure in a braking system of the vehicle during braking;
    identifying a threshold hydraulic pressure in the braking system when the vehicle speed decreases due to braking while the throttle is applied; and
    suspending detection for the minispare tire when the hydraulic pressure in the braking system is above the threshold hydraulic pressure during braking while the vehicle is in motion.

2. The method of claim 1, further comprising recording the threshold hydraulic pressure associated with the vehicle speed and the throttle position in a data storage unit of the vehicle.

3. The method of claim 1, further comprising maintaining a constant throttle position in the vehicle.

4. The method of claim 1, wherein the threshold hydraulic pressure is equal to the hydraulic pressure measured when the vehicle speed decreases by 5 kph.

5. The method of claim 1, wherein the threshold hydraulic pressure is equal to the hydraulic pressure measured when the vehicle speed decreases by 10 kph.

6. The method of claim 1, wherein the vehicle comprises a vehicle control system.

7. The method of claim 6, wherein the vehicle control system is an antilock braking system, a traction control system, or an electronic stability control system.

8. The method of claim 1, wherein the measuring the hydraulic pressure in the braking system occurs at a master cylinder of the braking system.

9. The method of claim 1, wherein the measuring the hydraulic pressure in the braking system occurs at one or more of a plurality of wheels of the vehicle.

10. The method of claim 1, wherein the threshold hydraulic pressure is at least 10 bar.

11. The method of claim 1, wherein the threshold hydraulic pressure is at least 25 bar.

12. The method of claim 1, wherein the threshold hydraulic pressure is at least 50 bar.

13. The method of claim 1, wherein the threshold hydraulic pressure is at least 70 bar.

14. The method of claim 1, wherein the threshold hydraulic pressure is at least 100 bar.

* * * * *